United States Patent
Batra et al.

(10) Patent No.: US 10,261,703 B2
(45) Date of Patent: Apr. 16, 2019

(54) SHARING READ-ONLY DATA AMONG VIRTUAL MACHINES USING COHERENT ACCELERATOR PROCESSOR INTERFACE (CAPI) ENABLED FLASH

(71) Applicant: International Business Machines Corporation, Armonk, NY (US)

(72) Inventors: Gaurav Batra, Cedar Park, TX (US); Anil Kumar K. Damodaran, Cedar Park, TX (US); Douglas Griffith, Spicewood, TX (US); Amarendar N. Sulu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 14/965,054

(22) Filed: Dec. 10, 2015

(65) Prior Publication Data

US 2017/0168736 A1     Jun. 15, 2017

(51) Int. Cl.
*G06F 3/06* (2006.01)
*G06F 9/455* (2018.01)

(52) U.S. Cl.
CPC ............ *G06F 3/0619* (2013.01); *G06F 3/065* (2013.01); *G06F 3/0622* (2013.01); *G06F 3/0656* (2013.01); *G06F 3/0679* (2013.01); *G06F 3/0685* (2013.01); *G06F 9/45558* (2013.01); *G06F 2009/45579* (2013.01); *G06F 2009/45583* (2013.01)

(58) Field of Classification Search
CPC ...... G06F 3/0619; G06F 3/065; G06F 3/0685; G06F 9/45533; G06F 9/45558; G06F 2009/45562; G06F 2009/45583
See application file for complete search history.

(56) References Cited

U.S. PATENT DOCUMENTS

| | | | |
|---|---|---|---|
| 6,789,156 B1 * | 9/2004 | Waldspurger | ....... G06F 12/1018 711/202 |
| 7,222,132 B2 | 5/2007 | Tormasov et al. | |

(Continued)

OTHER PUBLICATIONS

VMware, Inc., "VMFS File Locking and Its Impact in VMware® View™ 5.1," http://www.vmware.com/files/pdf/techpaper/vmware-view-vmfs-file-locking.pdf, Technical White Paper, 2012, pp. 1-16.

(Continued)

*Primary Examiner* — Mano Padmanabhan
*Assistant Examiner* — Andrew J Cheong
(74) *Attorney, Agent, or Firm* — Teddi E. Maranzano

(57) ABSTRACT

Sharing read-only data among virtual machines (VM) using an attached coherent accelerator processor interface (CAPI) enabled flash storage (CeFS) is provided. The method includes mapping a file, by a virtual machine monitor, from the CeFS into a range of common memory in the virtual machine monitor. The VM shares the mapped file with at least one other VM at a range of common memory in their address spaces. A redirect-on-write filesystem (RoWFS) is created on the VM and the at least one other VM, whereby the RoWFS includes a read-only copy and a private copy of a linear memory map of the mapped file. A data page is read using the copy of the linear memory map, and the data page is modified using the private copy of the linear memory map.

20 Claims, 4 Drawing Sheets

(56) References Cited

U.S. PATENT DOCUMENTS

| | | | |
|---|---|---|---|
| 7,721,064 B1* | 5/2010 | Lam | G06F 12/023 |
| | | | 711/100 |
| 7,783,665 B1 | 8/2010 | Tormasov et al. | |
| 7,882,198 B2* | 2/2011 | Landau | G06F 9/44563 |
| | | | 709/214 |
| 8,656,386 B1* | 2/2014 | Baimetov | G06F 9/45558 |
| | | | 709/219 |
| 9,274,974 B1* | 3/2016 | Chen | G06F 12/109 |
| 2006/0089950 A1* | 4/2006 | Tormasov | G06F 17/30067 |
| 2010/0036889 A1* | 2/2010 | Joshi | G06F 17/30194 |
| | | | 707/821 |
| 2010/0083247 A1 | 4/2010 | Kanevsky et al. | |
| 2012/0036334 A1* | 2/2012 | Horman | G06F 12/109 |
| | | | 711/165 |
| 2014/0040577 A1* | 2/2014 | Gheith | G06F 12/023 |
| | | | 711/162 |
| 2014/0075127 A1* | 3/2014 | Garthwaite | G06F 9/4881 |
| | | | 711/147 |

OTHER PUBLICATIONS

Griffiths, "Shared Storage Pools 3 and Systems Director 6.3.2," IBM: AIXpert Blog, https://www.ibm.com/developerworks/community/blogs/aixpert/entry/shared_storage_pools_3_and_systems_director_6_3_297?lang=en, Dec. 18, 2012, pp. 1-5.

IBM, "STNFS short-term network file systems," STNFS short-term network file systems, http://www-01.ibm.com/support/knowledgecenter/ssw_aix_61/com.ibm.aix.networkcomm/nfs_short_term_filesystem.htm, printed on Dec. 4, 2015, 1 page.

* cited by examiner

SHARING READ-ONLY DATA AMONG VIRTUAL MACHINES USING COHERENT ACCELERATOR PROCESSOR INTERFACE (CAPI) ENABLED FLASH

BACKGROUND

Embodiments of the present invention relate generally to the field of computer storage management, and more particularly to sharing read-only data among virtual machines using CAPI-enabled flash.

Flash storage devices, also referred to as Solid State Disk (SSD) devices, generally demonstrate advantages over Hard Disk Drives (HDD) because they are based on a semiconductor memory technology rather than on rotating mechanical media as in HDDs. Flash storage devices generally exhibit lower latencies and faster response times. These characteristics offer higher throughput, especially for enterprise workloads such as data analytics that are Input/Output (I/O) intensive. Although having nearly no seek time, a flash write cycle may take significantly more time than a read request. Due to the architectural characteristics of flash storage technology, the physical amount of data written exceeds the logical I/O request. In flash storage technology, data is not directly overwritten, but is only marked for later deletion, an operation that occurs at the block level. Therefore, over time data in a file may become increasingly fragmented and spread over several blocks. The process includes mapping and updating the location of the data within the blocks, then erasing the affected blocks. To circumvent the slower write cycle, a significant portion of a flash storage unit is dedicated to caching and spooling writes to the actual flash storage devices. Additionally, to ensure durability a 300 gigabyte (GB) flash drive actually may have 600 GB of capacity to compensate for the limited write cycle life inherent in a flash device. The flash drive includes controllers, software and drivers to manage the block relocation and the write cycle life.

Using flash-based storage without requiring large amounts of write cache and intelligent controllers may extend the useful life of the flash storage and increase performance in cloud and virtualized enterprise server environments.

SUMMARY

According to one embodiment, a method for sharing read-only data among virtual machines (VM) using an attached coherent accelerator processor interface (CAPI) enabled flash storage (CeFS) is provided. The method includes mapping a file, by a virtual machine monitor, from the CeFS into a range of common memory in the virtual machine monitor. The method provides including the range of common memory in the VM internal address space, whereby the VM shares the mapped file with at least one other VM. The method provides creating a redirect-on-write filesystem (RoWFS) on the VM and the at least one other VM, whereby the RoWFS includes a read-only copy and a private copy of a linear memory map of the mapped file. The method provides reading a data page using the copy of the linear memory map, and modifying the data page using the private copy of the linear memory map.

According to another embodiment, a computer program product for sharing read-only data among virtual machines (VM) using an attached coherent accelerator processor interface (CAPI) enabled flash storage (CeFS) is provided. The computer program product includes a redirect-on-write filesystem (RoWFS) of a computer operating system embodied on a computer readable storage medium, the RoWFS including program instructions executable by a processor. The program instructions include program instructions to map a file, by a virtual machine monitor, from the CeFS into a range of common memory in the virtual machine monitor. The computer program product includes program instructions to include the range of common memory in the VM internal address space, whereby the VM shares the mapped file with at least one other VM. The computer program product includes program instructions to create a redirect-on-write filesystem (RoWFS) on the VM and the at least one other VM, whereby the RoWFS includes a read-only copy and a private copy of a linear memory map of the mapped file. The computer program product includes program instructions to read a data page using the copy of the linear memory map, and modifying the data page using the private copy of the linear memory map.

According to another embodiment, a computer system for sharing read-only data among virtual machines (VM) using an attached coherent accelerator processor interface (CAPI) enabled flash storage (CeFS) is provided. The computer system includes one or more processors, one or more computer-readable storage devices, and a plurality of program instructions stored on at least one of the one or more storage devices for execution by at least one of the one or more processors. The program instructions map a file, by a virtual machine monitor, from the CeFS into a range of common memory in the virtual machine monitor. The program instructions include the range of common memory in the VM internal address space, whereby the VM shares the mapped file with at least one other VM. The program instructions create a redirect-on-write filesystem (RoWFS) on the VM and the at least one other VM, whereby the RoWFS includes a read-only copy and a private copy of a linear memory map of the mapped file. The program instructions read a data page using the copy of the linear memory map, and modify the data page using the private copy of the linear memory map.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
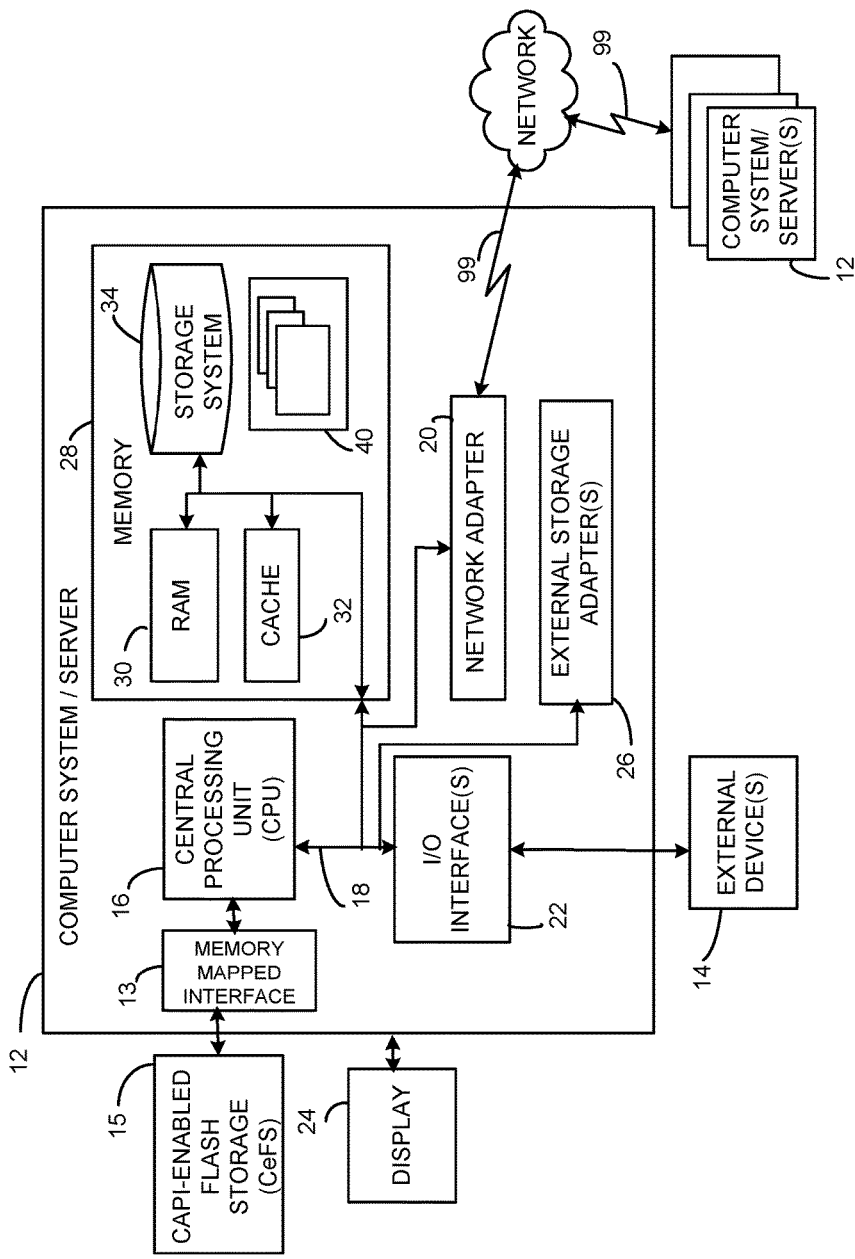
FIG. 1 illustrates an exemplary computer system environment operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

Embodiments of the present invention relate generally to the field of computer storage management, and more particularly to sharing read-only data among virtual machines (VM) using coherent accelerator processor interface (CAPI) enabled flash.

The following described exemplary embodiments provide a system, method and program product having the capacity to improve the technical field of computer storage management by providing high throughput and low latency access to read-only data using memory mapped flash storage.

Current technology for sharing data includes exporting a filesystem over a network from a server as in network file system (NFS) and short-term NFS (STNFS). In virtual environments, such as IBM® PowerVM® and VMware Virtual Machine File System (VMFS) (VMware and VMFS are registered trademarks or trademarks of VMware, Inc. in the United States and/or other jurisdictions), the virtual disks are exported to the VM clients as SCSI targets. In all three systems, latency is imposed on the read-only copy by the requirement to remap page faults into SCSI or NFS I/O requests that are scheduled through an operating system. The requests to resolve page faults are sent to a virtual machine monitor (hereinafter referred to as a hypervisor) or NFS server and this may impose further bottlenecks. Furthermore, this remapping prevents the computer system from using a common cache across VMs.

The flash storage may perform at speeds similar to the host processor because the flash storage is attached to the host processor through the CAPI interface, such as a CAPI-enabled PCI-e adapter. This attachment removes the overhead of the I/O subsystem, since data transfers may happen between the memory and caches of the CAPI interface and the host processor.

Flash storage devices tends to have a more limited life cycle compared to Hard Disk Drives (HDD) because flash storage devices are based on a semiconductor memory technology rather than on rotating mechanical media as in the HDDs. In flash storage devices, the oxide layer separating the floating gate from the substrate degrades over time during the normal course of writing and erasing data, reducing the device's ability to hold a charge and resulting in uncorrectable errors. Therefore, flash storage devices may actually contain an additional percentage of flash media that is unavailable to the computer system, but is used by the flash storage subsystem for error correction when the configured blocks fail. Being read-only, the CAPI-enabled flash storage (CeFS) is less affected by the limited life cycle issue. As such, it may be possible to configure the entire CeFS to be usable by the computer system, including the percentage reserved for error correction.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

FIG. 1 illustrates a block diagram of an exemplary computer system (i.e., server) 12 operable for various embodiments of the disclosure. As shown, the server 12 is only one example of a suitable computer for implementing a CeFS system and is not intended to suggest any limitation as to the scope of use or functionality of embodiments of the disclosure described herein. The server 12 may be a standalone machine or a virtual machine (VM) on physical host. A VM is a proxy for a physical server that has the same capabilities, interfaces, and state. VMs are created and managed by a virtual machine monitor (not shown) that is integrated into the server 12. The virtual machine monitor, also referred to as a hypervisor, may be implemented in hardware, firmware, software, or a combination thereof. Through the hypervisor, each VM appears to its operating system that the processor(s) (CPU) 16, memory 28, and I/O adapter(s) 22 and 26, and other hardware resources, are dedicated to that VM's exclusive use.

A cloud, or distributed, computing environment can include multiple servers 12, both standalone and virtual. Cloud computing is a service delivery mode for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. The servers 12, both virtual and standalone may be linked together and communicate through a communications network, such as the network 99.

The server 12 may be described in the context of executable instructions, such as a program, or more specifically, an operating system (OS) 40 that is an aggregate of program modules, components, objects, logic, or data structures, for example, being executed by the CPU 16 to control the operation of the server 12. At least a portion of the OS 40, may be specialized to execute the algorithm of FIG. 3, including implementing and managing a redirect-on-write (RoWFS) filesystem in cooperation with the hypervisor. The RoWFS may be implemented as an extension of the OS 40, for example a kernel extension.

As shown in FIG. 1, the components of the server 12 may include, but are not limited to, one or more CPUs 16, a system memory 28, and a bus 18 that couples various system components, such as the system memory 28, to the CPU 16.

System memory 28 can include computer system readable media in the form of volatile memory, such as random access memory (RAM) 30 and/or cache memory 32. The server 12 may further include other removable/non-removable, volatile/non-volatile computer system storage media. By way of example only, a storage system 34 can be provided as one or more devices for reading from and writing to a non-removable, non-volatile magnetic media, such as a hard disk drive (HDD) or an optical disk drive such as a CD-ROM, DVD-ROM. Each device of the storage system 34 can be connected to bus 18 by one or more data media interfaces. The OS 40, and one or more application programs may be stored on the storage system 34 and subsequently loaded into memory 28 for execution, as needed.

The server 12 may also communicate with one or more external devices 14 such as a keyboard, a pointing device, a display 24, etc.; one or more devices that enable a user to interact with the server 12; and/or any devices (e.g., network card, modem, etc.) that enable the server 12 to communicate with one or more other computing devices. Such communication can occur via I/O interfaces 22. As will be discussed with reference to FIG. 4, server 12 may include internal components 800 and external components 900, respectively.

The server 12 can communicate with one or more networks such as a local area network (LAN), a general wide area network (WAN), and/or a public network (e.g., the Internet) via a network adapter 20. As depicted, the network adapter 20 communicates with the other components of the server 12 via bus 18.

External storage adapter 26 connects the server 12 with external storage subsystems. Exemplary external storage adapters 26 include, but are not limited to, a host bus adapter (HBA), host channel adapter (HCA), SCSI, and iSCSI, depending upon the architectural implementation. The external storage adapter 26 communicates with the CPU 16 and memory 28 of the server 12 over bus 18.

CeFS 15 connects to the CPU 16 using a memory mapped interface 13, such as a CAPI-enabled PCI-e adapter. This provides a high bandwidth, low latency path between the CPU 16 and the flash storage array 15, bypassing the traditional I/O subsystem. The CPU 16 may use a portion of system memory 28 as cache for mapping data pages from the flash storage array 15 into memory segments that are attached to VMs.

It should be understood that although not shown, other hardware and/or software components could be used in conjunction with the server 12. Examples include, but are not limited to: microcode, device drivers, redundant processing units, external disk drive arrays, RAID systems, tape drives, and data archival storage systems, etc.

Figure 2:
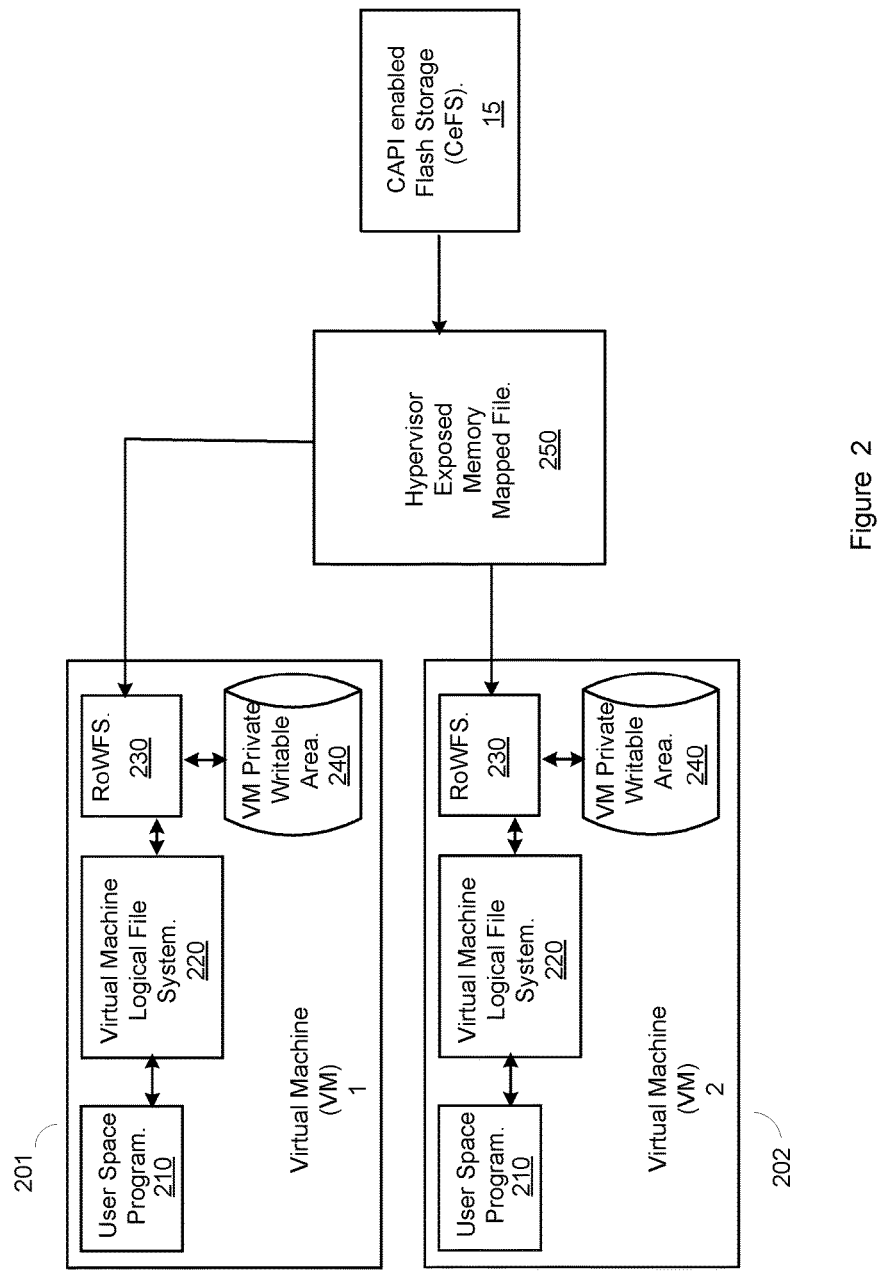
FIG. 2 illustrates sharing the components in the CAPI-enabled flash environment, according to various embodiments of the disclosure.

FIG. 2 illustrates an exemplary computing environment that includes two virtual machines, 201 and 202 on server 12 (FIG. 1). The CeFS 15 is attached to the server 12 by a memory mapped interface 13 (FIG. 1), such as a CAPI-enabled PCI-e adapter. The CeFS 15 may be any enterprise-level flash storage device. The hypervisor (not shown) performs virtual memory management and CAPI cache management. The CAPI attachment, i.e., the memory mapped interface 13 (FIG. 1), includes a co-processor that communicates with the hypervisor and the processor subsystem 16 (FIG. 1) to create a memory mapped file of the contents of the CeFS 15 in a cached area 32 (FIG. 1) of physical memory. The cached area 32 may be memory that is dedicated to the hypervisor. The memory mapped file is referenced through a linear map, whereby the data in the memory mapped file from the CeFS file appears as a contiguous address range, even though the data may not be stored contiguously on the flash storage device. The data may be organized in blocks, pages, or segments. A segment may include more than one page, and a page may include more than one block. Various tables and control structures map the location of data on the physical CeFS such that the data in the memory mapped file appear as a contiguous address range. Data retrieval is performed through the linear memory map using the base address of the file in memory as a base, and an offset into the file to locate the desired data. The origin of the memory mapped file is mapped at the same address in each VM address space sharing the memory mapped file. The physical memory and cache may be memory that is allocated and dedicated to the hypervisor for creating and managing the memory mapped file. One or more linear memory maps may exist since the CeFS 15 may contain one or more files that can be mapped into memory. In this example, the hypervisor exposes the memory mapped file 250 to two VMs, VM1 201 and VM2 202. as part of the VM's internal address space. A VM address space includes memory that is allocated for operating system and application use. The VM address space also includes memory that is internal to the VM and that is used to store various control structures for managing VM operations and communicating with the hypervisor.

A RoWFS 230 is created on each VM that participates in sharing the memory mapped file 250, and can be implemented as an operating system extension that cooperates with the hypervisor to perform data read and write operations.

The RoWFS 230 accesses the memory mapped file 250 through its copy of the linear memory map. A RoWFS 230 can map any type of data object including user data, text data (i.e., program executables), and metadata, such as extent maps, directories, and control blocks.

The RoWFS 230 manages two copies of the linear memory map. The first is a read-only copy of the common linear memory map that is shared by the participating VMs. This map may be stored in the VM internal address space cache memory. Since the map is read-only, the participating VM may refresh its cached copy from the hypervisor, if needed. The RoWFS 230 initially reads data through the read-only copy of the linear memory map. The second map is a private copy of the read-only linear memory map. The private copy initially is empty when the VM is activated and the RoWFS 230 is created. The RoWFS 230 updates the private copy as the VM modifies data from the memory mapped file 250. When the VM modifies the data, the corresponding location in the private map is updated. The modified data page is stored on a dedicated tangible storage device in the VM private writable area (VMPWA) 240. The data page may be stored using any known standard filesystem structure, such as a hierarchical filesystem that includes inodes that describe the properties of the file and directories. The private map is kept in the VM internal address space cache memory and may include the latest modified locations. The private map is periodically flushed to a permanent copy on the dedicated tangible storage device in the VMPWA 240. The user space program 210, typically an application program or the operating system, forms a request to read or write data using standard I/O subsystem instruction formats. The VM logical file system 220 receives the read or write data request and contacts the RoWFS 230 if the request is for the memory mapped file 250. However, if the read or write data request is for a non-CeFS file, the VM logical file system 220 can form an I/O request that the operating system can send to the I/O subsystem. If an application's files are migrated to/from CeFS and non-CeFS storage, the application program may execute in either environment without modifying I/O system calls. In a non-CeFS environment, the VM logical file system 220 can receive and execute the I/O requests through the I/O subsystem. In the CeFS environment, the RoWFS 230 receives and executes the I/O requests on behalf of the VM logical file system 220.

Figure 3:
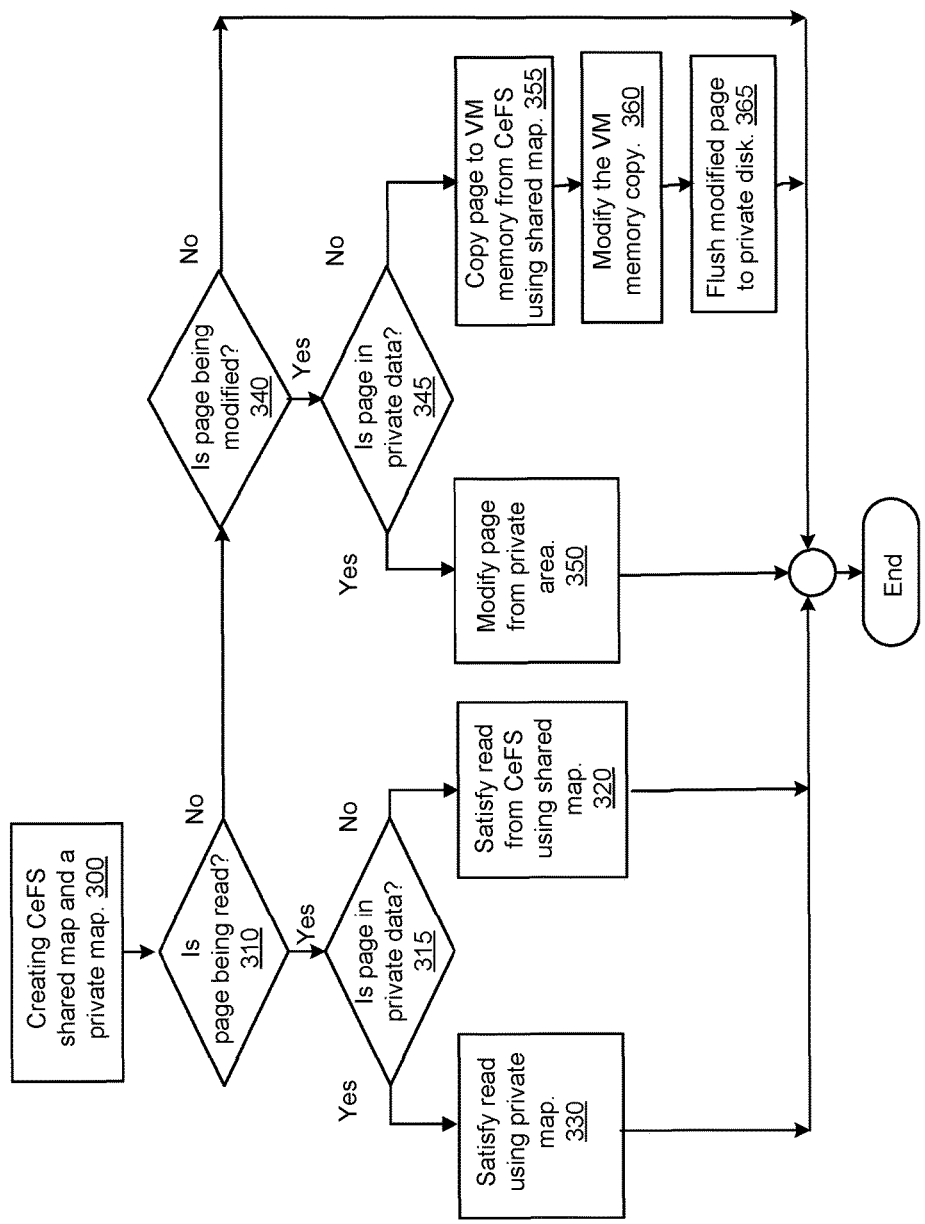
FIG. 3 illustrates an operational flow chart for sharing read-only data among virtual machines using CAPI-enabled flash, according to various embodiments of the disclosure.

FIG. 3 illustrates an operational flow chart for sharing read-only data among VMs using CeFS. One skilled in the art of computer architecture can appreciate that the algorithm described with reference to FIG. 3 can be practiced in any hardware platform having coherent memory, the including IBM® Power Architecture® and the Intel® processor.

At 300 an application or operating system in the VM issues a request to open a file. The request is sent to the RoWFS 230 (FIG. 2), since the request is for a memory mapped file 250 (FIG. 2) from CeFS 15 (FIGS. 1 and 2). The RoWFS 230 creates a read-only copy of the common linear memory map that is shared by the participating VMs, and a private copy of the common linear memory map that the RoWFS 230 maintains to track locally modified data pages.

At 310, if the request is to read data, then at 315 the RoWFS 230 may use known virtual memory management techniques to check various segment, inode, and page tables to determine if this VM previously modified the page containing this data. The various tables may reside in VM internal address space cache memory or in other areas of the VM address space memory. If the requested page containing the data is previously modified, then at 330 the RoWFS 230 satisfies the read request using the private copy of the linear memory map. The RoWFS 230 may use known virtual memory management techniques to locate the most current version of the page containing the data, using either the private copy of the linear memory map in the VM internal address space cache memory or the permanent copy of the map on the dedicated tangible storage device in the VMPWA 240. If at 315 the requested data page has not been modified, then at 320 the RoWFS 230 satisfies the read request using the read-only copy of the linear memory map to retrieve the data page from the memory mapped file 250 (FIG. 2) in the VM's internal address space. Since the memory mapped file 250 is read-only, no locks are needed. Additionally, system calls to the I/O subsystem are avoided.

Returning to 310, at 340 if the page is being modified, then in processing similar to that in 310, at 345 the RoWFS 230 may use known virtual memory management techniques to check various segment, inode, and page tables to determine if this VM previously modified this data. At 350, if the requested data page is previously modified, then the RoWFS 230 uses the private copy of the linear memory map to retrieve the requested data page from either VM internal address space cache memory or the dedicated tangible storage device in the VMPWA 240, depending on which copy of the data page is the most current.

Returning to 345, if the requested data age has not been modified, then at 355 the RoWFS 230 retrieves the data page into VM memory that is accessible to the requesting application or operating system from the memory mapped file 250 (FIG. 2) in the VM's internal address space cache memory, using the read-only copy of the linear memory map. At 360, the application or operating system modifies the data page. The RoWFS 230 updates the private copy of the linear memory map to reflect the modified data page. At 365, following data modification, the RoWFS 230 flushes the modified data page to the dedicated tangible storage device in the VMPWA 240. The RoWFS 230 may flush the modified private copy of the linear memory map along with the modified data page, or separately. If the page is not being read (310) and is not being modified (340), then processing ends.

Figure 4:
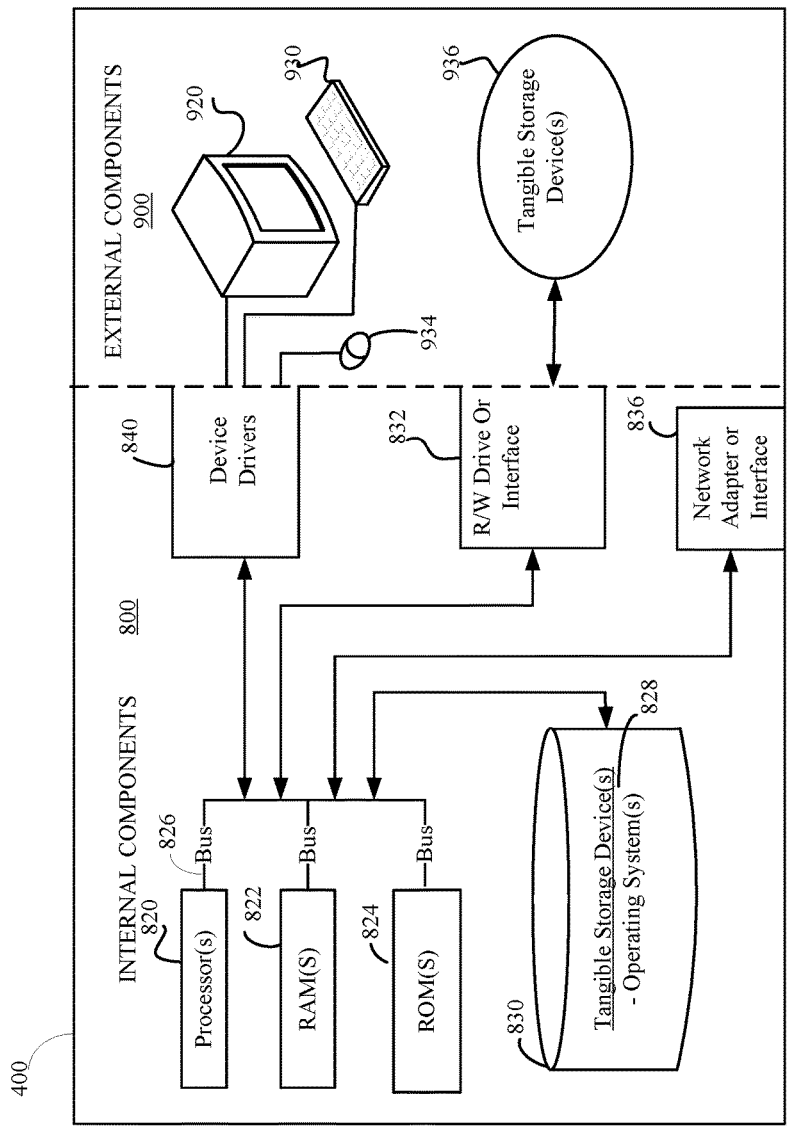
FIG. 4 is a schematic block diagram of the hardware and software of the computer environment according to an embodiment of the method of FIG. 3.

FIG. 4 illustrates an exemplary computing device 400 applicable for executing the algorithm of FIG. 3. Computing device 400 may include respective sets of internal components 800 and external components 900 that together may provide an environment for a software application. Each of the sets of internal components 800 includes one or more processors 820; one or more computer-readable RAMs 822; one or more computer-readable ROMs 824 on one or more buses 826; one or more operating systems 828 executing the method illustrated in FIG. 3; and one or more computer-readable tangible storage devices 830. The one or more operating systems 828 are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 400, can be downloaded to computing device 400 from an external computer (e.g., server) via a network (for example, the Internet, a local area network, or other wide area network) and respective network adapters or interfaces 836. From the network adapters (or switch port adapters) or interfaces 836 and operating system 828 associated with computing device 400 are loaded into the respective tangible storage device 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A processor-implemented method for sharing read-only data among a plurality of virtual machines (VM) using a coherent accelerator processor interface (CAPI) enabled flash storage (CeFS) directly coupled to a CPU of a computer system by a memory mapped interface, comprising:
mapping a file from the CeFS into a cache memory as a read-only memory mapped file, by a virtual machine monitor communicating with a co-processor of the memory mapped interface and the CPU;
exposing the read-only memory mapped file to the plurality of virtual machines as a contiguous address range having an origin address in each of the virtual machines, wherein the origin address and the contiguous address range is common to the virtual machine monitor and the plurality of virtual machines;
creating a redirect-on-write filesystem (RoWFS) on each of the plurality of VMs that are sharing the read-only memory mapped file, wherein each RoWFS includes the origin address of the read-only memory mapped file, wherein the VM accesses data in the read-only memory mapped file by the origin address and an offset, and an initially empty private memory map corresponding to the read-only memory mapped file, wherein updates to the read-only memory mapped file are written to the private memory map.

2. The method of claim 1, further comprising:
in response to receiving a request to read a data page from the read-only memory mapped file, retrieving the data page using either the private memory map, or the read-only memory mapped file, based on whether the VM previously modified the data page.

3. The method of claim 1, further comprising:
in response to receiving a request to modify a data page from the read-only memory mapped file,
retrieving the data page using either the private memory map or the read-only memory mapped file, based on whether the VM previously modified the data page; and
updating the private memory map and flushing the modified data page and the updated private memory map to a VM private writable area.

4. The method of claim 1, wherein the RoWFS includes the origin address of the read-only-memory mapped file, and the private memory map, and a VM private writable area, wherein the VM private writable area includes a dedicated tangible storage device.

5. The method of claim 1, wherein each participating VM shares one read-only copy of the read-only memory mapped file that is accessed by the origin address, and wherein each participating VM has a dedicated private memory map and a dedicated private copy of the data page modified by the participating VM.

6. The method of claim 1, wherein the read-only memory mapped file is created in a range of common memory in the virtual machine monitor, and wherein the range of common memory is exposed into one or more address spaces of VMs sharing the read-only memory mapped file.

7. The method of claim 3, wherein the data page is retrieved from the VM private writable area based on the data page being located using the private memory map, and wherein the data page is retrieved from the read-only memory mapped file based on the data page being located using the origin address of the read-only memory mapped file.

8. A computer program product for sharing read-only data among a plurality of virtual machines (VM) using a coherent accelerator processor interface (CAPI) enabled flash storage (CeFS) directly coupled to a CPU of a computer system by a memory mapped interface, comprising:
a redirect-on-write filesystem (RoWFS) of a computer operating system embodied on a computer readable storage medium, the RoWFS including program instructions executable by a processor, the program instructions comprising:
program instructions to map a file from the CeFS into a cache memory as a read-only memory mapped file, by a virtual machine monitor communicating with a co-processor of the memory mapped interface and the CPU;
program instructions to expose the read-only memory mapped file to the plurality of virtual machines as a contiguous address range having an origin address in each of the virtual machines, wherein the origin address and the contiguous address range is common to the virtual machine monitor and the plurality of virtual machines;
program instructions to create a redirect-on-write filesystem (RoWFS) on each of the plurality of VMs that are sharing the read-only memory mapped file, wherein each RoWFS includes the origin address of the read-only memory mapped file, wherein the VM accesses data in the read-only memory mapped file by the origin address and an offset, and an initially empty private memory map corresponding to the read-only memory mapped file.

9. The computer program product of claim 8, further comprising:
in response to program instructions to read a data page from the read-only memory mapped file, retrieving the data page using either the private memory map, or the read-only memory mapped file, based on whether the VM previously modified the requested data page.

10. The computer program product of claim 8, further comprising:
in response to program instructions to modify a data page from the read-only memory mapped file,
program instructions to retrieve the data page using either the private memory map or the read-only memory mapped file, based on whether the VM previously modified the requested data page; and
program instructions to update the private memory map and flush the modified data page and the updated private memory map to a VM private writable area.

11. The computer program product of claim 8, wherein the RoWFS includes the origin address of the read-only memory mapped file, and the private memory map, and a VM private writable area, wherein the VM private writable area includes a dedicated tangible storage device.

12. The computer program product of claim 8, wherein each participating VM shares one read-only copy of the memory mapped file that is accessed by the origin address, and wherein each participating VM has a dedicated private memory map and a dedicated private copy of the data page modified by the participating VM.

13. The computer program product of claim 8, wherein the read-only memory mapped file is created in a range of common memory in the virtual machine monitor, and wherein the range of common memory is exposed into one or more address spaces of VMs sharing the read-only memory mapped file.

14. The computer program product of claim 10, wherein the data page is retrieved from the VMPWA based on the data page being located using the private memory map, and wherein the data page is retrieved from the read-only memory mapped file based on the data page being located using the origin address of the read-only memory mapped file.

15. A computer system for sharing read-only data among a plurality of virtual machines (VM) using a coherent accelerator processor interface (CAPI) enabled flash storage (CeFS) directly coupled to a CPU by a memory mapped interface, comprising:

one or more processors, one or more computer-readable storage devices, and a plurality of program instructions stored on at least one of the one or more storage devices for execution by at least one of the one or more processors, the plurality of program instructions comprising:

program instructions to map a file from the CeFS into a cache memory as a read-only memory mapped file, by a virtual machine monitor communicating with a coprocessor of the memory mapped interface and the CPU;

program instructions to expose the read-only memory mapped file to the plurality of virtual machines as a contiguous address range having an origin address in each of the virtual machines, wherein the origin address and the contiguous address range is common to the virtual machine monitor and the plurality of virtual machines;

program instructions to create a redirect-on-write filesystem (RoWFS) on each of the plurality of VMs that are sharing the read-only memory mapped file, wherein each RoWFS includes the origin address of the read-only memory mapped file, wherein the VM accesses data in the read-only memory mapped file by the origin address and an offset, and an initially empty private memory map corresponding to the read-only memory mapped file.

16. The computer system of claim 15, further comprising:
in response to program instructions to read a data page from the read-only memory mapped file, retrieving the data page using either the private memory map, or the read-only memory mapped file, based on whether the VM previously modified the requested data page.

17. The computer system of claim 15, wherein the RoWFS includes the read-only memory mapped file that is accessed by the origin address, and the private memory map, and a VM private writable area, wherein the VM private writable area includes a dedicated tangible storage device.

18. The computer system of claim 15, wherein the read-only memory mapped file is created in the range of common memory in the virtual machine monitor, and wherein a range of common memory is exposed into one or more address spaces of VMs sharing the read-only memory mapped file.

19. The computer system of claim 15, further comprising:
in response to program instructions to modify a data page from the read-only memory mapped file,
program instructions to retrieve the data page using either the private memory map or the read-only memory mapped file, based on whether the VM previously modified the requested data page; and
program instructions to update the private memory map and flush the modified data page and the updated private memory map to a VM private writable area.

20. The computer system product of claim 17, wherein the data page is retrieved from the VM private writable area based on the data page being located using the private memory map, and wherein the data page is retrieved from the read-only memory mapped file based on the data page being located using the origin address of the read-only memory mapped file.

* * * * *